United States Patent [19]

Spencer et al.

[11] 4,424,989

[45] Jan. 10, 1984

[54] DRAIN HOLE

[75] Inventors: William R. Spencer, Springdale; George F. Whitley, Jr., Madeira, both of Ohio

[73] Assignee: General Electric Company, Cincinnati, Ohio

[21] Appl. No.: 165,432

[22] Filed: Jul. 2, 1980

[51] Int. Cl.³ .............................................. F16L 55/00
[52] U.S. Cl. ........................................ 285/14; 138/40; 65/101; 65/309; 415/168; 285/156
[58] Field of Search ........................... 285/13, 14, 156; 138/40; 137/312, 314, 204, 203; 415/168, 169; 60/39.07, 309

[56] References Cited

U.S. PATENT DOCUMENTS

| 2,111,878 | 3/1938 | Tongeren | 415/168 |
| 2,249,469 | 7/1941 | Gray et al. | 138/40 |
| 2,433,589 | 12/1947 | Adams | 415/169 |
| 2,526,219 | 10/1950 | Goddard | 60/39.07 |
| 2,921,432 | 1/1960 | Morcotte et al. | 60/309 |
| 3,426,526 | 2/1969 | Tornmarck | 60/309 |
| 3,906,984 | 9/1975 | Rich et al. | 137/171 |
| 3,977,426 | 8/1976 | Pyle | 137/204 |
| 4,052,178 | 10/1977 | Frantz | 55/212 |
| 4,224,826 | 9/1980 | McLoughlin | 138/40 |

FOREIGN PATENT DOCUMENTS 205301 9/1959 Fed. Rep. of Germany ........ 285/14

Primary Examiner—Dave W. Arola
Attorney, Agent, or Firm—Donald W. Walk; Derek P. Lawrence

[57] ABSTRACT

An improved drain hole is provided for a pneumatic line of a gas turbine engine. The improvement is essentially comprised of an enlargement that prevents liquid surface tension at the drain hole outer opening from inducing buildup of liquid inside the pneumatic line.

5 Claims, 2 Drawing Figures

DRAIN HOLE

BACKGROUND OF THE INVENTION

1. Field of the Invention

This invention relates to drain holes for discharging liquid buildup from inside pneumatic lines in gas turbine engines.

2. Summary of the Prior Art

Various types of modern machinery require the use of pneumatic lines to carry pressurized air from one location to another. Typically, this might be done for the purpose of transporting a pressurized gas such as compressed air for measuring or control purposes. As modern machinery becomes increasingly complex, machinery controls are becoming more responsive to gas and air pressures to beneficially affect machine operation.

One such current use of a pneumatic line is a compressor discharge pressure line (CDP line) on a modern gas turbine engine. This is an air signal line that functions as an input signal to an engine control for the purpose of metering fuel flow to attain a desired engine speed. Airflow of a gas turbine compressor should be a significant consideration in fuel metering control functions. The CDP air signal line provides a direct indication of the airflow of the compressor for use by the gas turbine engine control.

The CDP line itself is basically a simple tube or pipe that directly carries compressed air from the engine compressor. Because the compressed air is derived from ambient air, it will contain varying amounts of water in vaporized form. Temperature and pressure changes often cause these water vapors to condense on the inside walls of the air signal line, and if large amounts of water condense, a substantial body of free-standing water can form inside the CDP line.

In a typical gas turbine engine, free-standing water could present difficulties in engine operation. The engine often remains unused during winter months at subfreezing temperatures. The free-standing water could freeze in these conditions and block the air signal line, potentially affecting the CDP air pressure as monitored by the engine control. To prevent this scenario, air signal ines have been provided with small, round drain holes at the low point in the signal line. When the signal line carries pressurized air, the air blowing out of the drain holes effectively discharges excess water.

In order to prevent unacceptable losses of pressurized air, the drain holes are purposely made with a relatively small diameter. This, unfortunately, leads to problems when the engine is not in operation and the air in the signal lines is not pressurized. Compressed air will not blow out of the hole and, therefore, only the force of gravity will work to discharge water through the drain hole. Surface tension of the water across the drain hole can actually support significant amounts of water inside the air signal line. It has been found that with no pressure differential across it, a 0.02 inch (0.0508 cm) diameter drain hole orifice will typically retain about 0.5 inches (1.27 cm) of water above it. This might be enough to plug the signal line when the water freezes. To avoid this potential problem, a new drain hole construction is desired that will not permit surface tension to support significant amounts of free-standing water in the air signal line.

Therefore, it is an object of the present invention to provide an improved drain hole construction that will not support free-standing water inside a pneumatic line.

It is another object of the present invention to provide an improved drain hole construction that will not permit liquid surface tension at the drain hole exit to support free-standing water inside a pneumatic line when the line is not pressurized.

These and other objects of the present invention will become more readily apparent from reference to the following description taken in conjunction with the appended drawings.

SUMMARY OF THE INVENTION

In one embodiment of the present invention, a conical enlargement is added to an outer portion of a liquid drain hole in a pneumatic line. The enlargement expands to a relatively large cross-sectional area at its outer opening or point of exit. This relatively large cross-sectional area at the opening prevents liquid surface tension from supporting a significant buildup of liquid above the drain hole. By enlarging only the outer portion of the drain hole, the cross-sectional area at an inner portion of the drain hole, where the drain hole intersects the interior of the pneumatic line, can remain small in cross-sectional area to prevent excessive amounts of gas or compressed air from being blown out of the drain hole.

DESCRIPTION OF THE PREFERRED EMBODIMENTS

Figure 1:
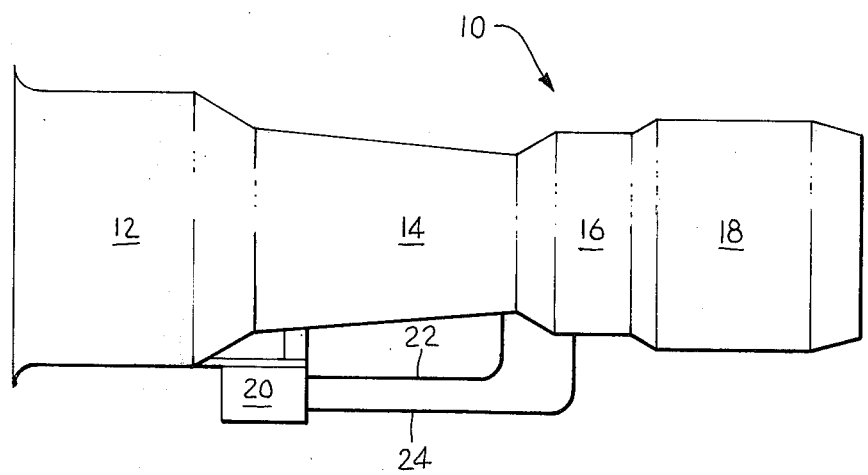
FIG. 1 is a diagrammatic representation of a gas turbine engine.

Referring now to FIG. 1, a typical, modern gas turbine engine 10 is shown. The engine 10 is modified for industrial use and comprises a compressor 14, combustor 16, and turbine 18. During engine operation, the compressor 14 compresses incoming ambient air and channels the compressed air into the combustor 16 where it is mixed with fuel and ignited. The expanding products of combustion are channeled into the turbine 18 where rapidly flowing combustion gases are directed across turbine blades, causing the blades to rotate at high velocity to provide mechanical energy. Inside the engine 10, a longitudinally extending shaft transfers part of this energy forward to the compressor 14. The remaining portion of this energy is transmitted out of the engine for use in mechanical form.

To control the engine throughout different modes of operation, an engine control 20 is provided for metering the amount of fuel that is directed into the combustor 16 for fueling the combustive process. The engine control 20 monitors certain engine parameters in order to properly determine how much fuel should be provided. One of these parameters is compressor discharge pressure (CDP). This pressure is significant because it is an indication of how much compressed air is entering the combustor 16. This amount of air must be monitored by the engine control 20 because the combustor 16 must be provided with a proper air-fuel mixture. Thus, one of the primary functions of the engine control 20 is to use the CDP air signal to determine the appropriate air-fuel mixture.

In the engine 10, an air line 22 is provided to directly carry compressed air from the compressor 14 to the engine control 20. The control 20 uses this air pressure, in conjunction with other indications of engine parameters, to meter the fuel that is directed through a fuel line 24 into the combustor 16. It can be readily appreciated that providing the right amount of fuel is an important part of the engine control functions. The successful operation of the engine control 20 is directly dependent on a properly functioning CDP air signal line 22. It is important to maintain an unrestricted flowpath through the signal line 22 so the engine control 20 obtains an accurate indication of compressor pressure.

One of the problems in gas turbine engine operation is the wide range of temperatures to which the engine and its systems are subjected. These temperature variations can be particularly troublesome in engine air lines where liquid vapors, such as water vapor, might condense. If the engine is subjected to below-freezing temperatures, it is possible that enough liquid might condense and freeze to affect the operation of an air line.

To prevent such an occurrence, CDP air signal lines have been provided with small bleed holes or drain holes at a low point in the line. When the air line is pressurized, the air blows the condensed liquid through the drain hole and out of the line. The drain holes are kept to a relatively small size, usually about 0.02 inch (0.0508 cm) in diameter to prevent excessive losses of pressurized air. This particular size drain hole works quite well while the engine is in operation and the air line is pressurized. Unfortunately, when the engine is not in operation, the air inside the line is not pressurized. Without pressurization, surface tension can build up at the outer opening of the drain hole. This surface tension alone can actually support a significant amount of liquid above the drain hole. With no pressure differential, it has been projected that with a 0.02 inch (0.0508 cm) diameter orifice in the drain hole, surface tension could support up to 0.5 inches (1.27 cm) of water above it inside an air line. This potential problem could be resolved by simply enlarging the drain hole. However, in a CDP air line, this is not acceptable, because it is highly undesirable to bleed too much compressed air in view of the work that has been expended to compress that air.

Figure 2:
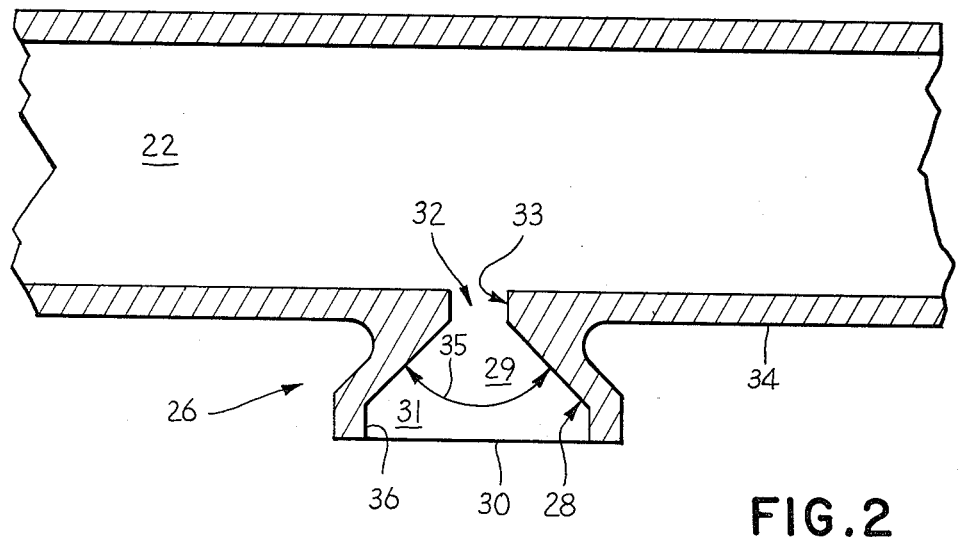
FIG. 2 is a cross-sectional view of a pneumatic line incorporating one embodiment of the present invention.

Referring now to FIG. 2, one embodiment of the present invention is shown which has been developed for the purpose of fully draining liquid from a pneumatic line 22 in a gas turbine engine while simultaneously limiting the amount of compressed air that is lost in the draining process.

The invention is shown with a progressive enlargement of an interior region 31 of a drain hole 26 having an inner opening 32 for draining a liquid, such as water. The enlargement might take any of a number of shapes. In the embodiment shown, an outer portion 28 of the drain hole interior region 31 has a conically-shaped enlargement. The exact shape of the enlargement need not necessarily be conical. This is because the purpose of the enlargement is to open the interior region 31 of the drain hole 26 to a relatively large cross-sectioned area at a drain hole outer opening 30. By providing a larger area at the outer opening 30, the liquid surface tension must extend over an increased area. This has the effect of diminishing the amount of liquid that can be supported above the drain hole orifice 29 by liquid surface tension existing at the outer opening 30. Because less liquid can be supported, there will be less liquid that can collect inside the air line 22, and this is the object of the drain hole invention. All of this can be accomplished with a drain hole 26 that is provided with a relatively small cross-sectional area at an inner opening 32 where the drain hole intersects with the air line 22. This lesser area has the advantage of permitting less compressed air to flow through the drain hole orifice, thus limiting whatever loss of compressed air is incurred. In a compressor discharge pressure line (CDP line) of a gas turbine engine, limiting this air loss will increase the engine's efficiency because of the work expended to compress this gas, as stated earlier.

While the contours of the drain hole construction need not be exactly as shown in FIG. 2, the details of the particular embodiment depicted will now be described for the purpose of clarification.

The drain hole 26 can be described as comprising two sections: an inner portion 33, where the drain hole generally mates with an air line outer wall 34; and the outer portion 28, where the drain hole is enlarged to the outer opening 30.

The inner portion 33 comprises a relatively small, round inner opening 32 in the air line 22. In one embodiment, the diameter of the opening is approximately 0.02 inches (0.0508 cm). While a round opening is generally preferable, it is posible that other shapes might also be used.

The inner portion 33 extends through the outer wall 34 of the air line 22, and beyond this region is the outer portion 28. The diameter of the drain hole orifice continuously expands throughout most of the outer portion 28 to a maximum diameter of approximately 0.12 inches (0.304 cm) at the outer opening 30. In the embodiment shown, an outermost portion 36 of the orifice does not continue to expand; however, this feature is not essential to the invention.

The pneumatic line 22 can be described as having inner and outer peripheral surfaces. In respect to these peripheral surfaces, the inner portion 33 of the drain hole 26 generally extends between the inner and outer peripheral surfaces. The inner opening 32 through the inner peripheral surface into the pneumatic line is of a size which would normally support liquid in the pneumatic line by surface tension forces of the liquid when the line is not under pressure. To prevent this from happening, the progressive enlargement of the interior region 31 of the drain hole 26 is provided. The progressive enlargement is initiated substantially at the outer peripheral surface of the pneumatic line in the embodiment shown. However, the location where the progressive enlargement is initiated may vary somewhat.

In order to promote draining without enhancing airflow, the conical enlargement of the interior region has interior walls with an included angle shown at 35 in a range of 60-90 degrees. This will promote a tendency of the liquid to move downward through the conical enlargement, to the opening 30, where surface tension cannot support liquid above the drain hole inner opening 32.

In operation, the liquid is directed towards the outer opening 30 by a combination of the weight of the liquid and surface tension. At a triple interface of air, water and metal in the outer portion which forms a cone, the water is attracted to the metal in the manner of a capillary tube, drawing the water down into the cone. As the water progresses into the cone the weight of water in the cone increases more rapidly than the supporting surface tension force until the pressure force, due to the weight of water, exceeds the surface tension force allowing a drop to separate and fall. Tests have indicated that the discharge diameter of the cone should be at least 0.12 inches (0.304 cm). This relates to the diameter of a drop of water and not to a certain diameter ratio from entrance to exit of the cone. When the liquid has dropped through the interior of the outer portion 28 to the outer opening 32, the surface tension generally will not support any liquid still remaining in an interior region of the line 22. The liquid will drain until a remaining, relatively small amount is held in the orifice of the inner portion 33 by surface tension.

While specific embodiments have been described, it will be apparent to those skilled in the art that various modifications thereto can be made without departing from the scope of the invention, as recited in the appended claims. Therefore, the scope of the invention is to be derived from the following claims.

Having described the invention, what is claimed as novel and desired to be secured by Letter Patent of the United States is as follows:

1. An improved drain hole in a pneumatic line for draining liquid from a pneumatic line of a gas turbine engine, said pneumatic line having inner and outer peripheral surfaces and wherein said drain hole has inner and outer portions in respect to said pneumatic line, and wherein said inner portion extends between said inner and outer peripheral surfaces and has an inner opening into said pneumatic line that is smaller in area relative to said outer opening to prevent excessive loss of pressurized gas from said line and which is of a size which would otherwise support liquid in the pneumatic line by surface tension forces of the liquid when the line is not under pressure except that said drain hole additionally comprises:
   a progressive enlargement in cross-sectional area of an interior region of the drain hole, said enlargement initiating substantially at said outer peripheral surface and wherein the enlargement has an outer opening with a larger cross-sectional area than that of the inner opening, said larger outer opening being provided for the purpose of preventing surface tension of said liquid at said outer opening from supporting buildup of liquid within said pneumatic line during periods when said pneumatic line does not contain pressurized gas.

2. The improved drain hole as recited in claim 1, wherein said enlargement has a conically-shaped interior region with a base of the cone forming said outer opening.

3. The improved drain hole as recited in claim 2, wherein said conically-shaped interior region further comprises:
   an interior wall with an included angle of between 60 degrees and 90 degrees for the purpose of promoting drainage of said liquid.

4. The improved drain hole as recited in claims 1, 2, or 3 wherein said area of said outer opening of said drain hole is round and at least 0.12 inches (0.304 cm) in diameter for the purpose of overcoming surface tension forces which would otherwise retain liquid in the pneumatic line.

5. An improved drain hole in a pneumatic line for draining liquid from a pneumatic line of a gas turbine engine, said pneumatic line having inner and outer peripheral surfaces and wherein said drain hole has inner and outer portions in respect to said pneumatic line, and wherein said inner portion extends between said inner and outer peripheral surfaces and has an inner opening that is smaller in area relative to said outer opening to prevent excessive loss of pressurized gas from said line, and which is of a size which would otherwise support liquid in the pneumatic line by surface tension forces of the liquid when the line is not under pressure except that said drain hole additionally comprises:
   a conically-shaped enlargement of an interior region of the outer portion of the drain hole; said conically shaped enlargement initiating substantially at said outer peripheral surface and having interior walls with an included angle of between 60 and 90 degrees for the purpose of promoting drainage of said liquid along the walls of said enlargement; and
   said conically-shaped enlargement having an outer opening generally formed by a base of the conically-shaped interior region, said opening having a relatively large area for the purpose of preventing surface tension of said liquid at said outer opening from supporting buildup of liquid within said pneumatic line during periods when said pneumatic line does not contain pressurized gas.

* * * * *